United States Patent
Shorter et al.

[11] Patent Number: 6,125,741
[45] Date of Patent: Oct. 3, 2000

[54] FOOD CUTTING DEVICE

[76] Inventors: Carolyn Shorter; James Shorter, both of 25 Clinton Ave., Ellenville, N.Y. 12428

[21] Appl. No.: 09/369,160

[22] Filed: Aug. 5, 1999

[51] Int. Cl.[7] ................ A23L 1/00; B26D 7/00; B26D 11/00
[52] U.S. Cl. ................ 99/537; 99/538; 99/584; 99/588; 99/589; 83/932
[58] Field of Search ............. 99/537–540, 541, 99/584–591, 623, 450.1, 353–355; 83/155, 157, 215, 266, 350, 673, 672, 676, 865, 707, 592, 596, 403.1, 425.1, 932; 426/502, 503, 389, 478; 425/363, 364 R, 374, 289, 315, 466

[56] References Cited

U.S. PATENT DOCUMENTS

| | | |
|---|---|---|
| D. 250,568 | 12/1978 | Belinkoff . |
| D. 256,318 | 8/1980 | Levin ........................ D07/384 |
| D. 282,620 | 2/1986 | Cavalli ....................... D7/384 |
| D. 292,364 | 10/1987 | Bartlett ...................... D7/384 |
| D. 316,207 | 4/1991 | Gabor ........................ D7/384 |
| D. 324,322 | 3/1992 | Barrault ..................... D7/384 |
| D. 345,079 | 3/1994 | Johnson ..................... D7/384 |
| D. 373,049 | 8/1996 | le Rouzic .................. D07/413 |
| D. 395,194 | 6/1998 | Wong . |
| 3,131,653 | 5/1964 | Bassano ................... 99/537 X |
| 4,275,649 | 6/1981 | Peterson et al. ......... 99/537 X |
| 4,534,151 | 8/1985 | Wilson ..................... 99/538 X |
| 4,629,005 | 12/1986 | Hood, Jr. et al. ........ 99/537 X |
| 5,230,267 | 7/1993 | Abler ....................... 83/932 X |
| 5,287,781 | 2/1994 | Fehr et al. ............... 83/155 X |
| 5,308,002 | 5/1994 | Pereira .................... 99/537 X |
| 5,331,874 | 7/1994 | Foster et al. ............ 99/584 X |
| 5,445,332 | 8/1995 | Shimizu et al. ........ 99/537 X |
| 5,894,775 | 4/1999 | Brash et al. ............ 83/932 X |
| 5,918,538 | 7/1999 | Rodriguez et al. ..... 99/537 X |
| 5,950,515 | 9/1999 | Wetzel .................... 83/932 X |
| 5,992,287 | 11/1999 | Dube ...................... 99/538 X |

*Primary Examiner*—Timothy Simone

[57] ABSTRACT

A food cutting device for processing leafy vegetables such as collard greens having a groove roller and a cutting roller with discs which engage the grooves of the groove roller to cut the leafy vegetable longitudinally and a cam-actuated blade that cuts the leafy vegetable across the longitudinal cuts.

10 Claims, 4 Drawing Sheets

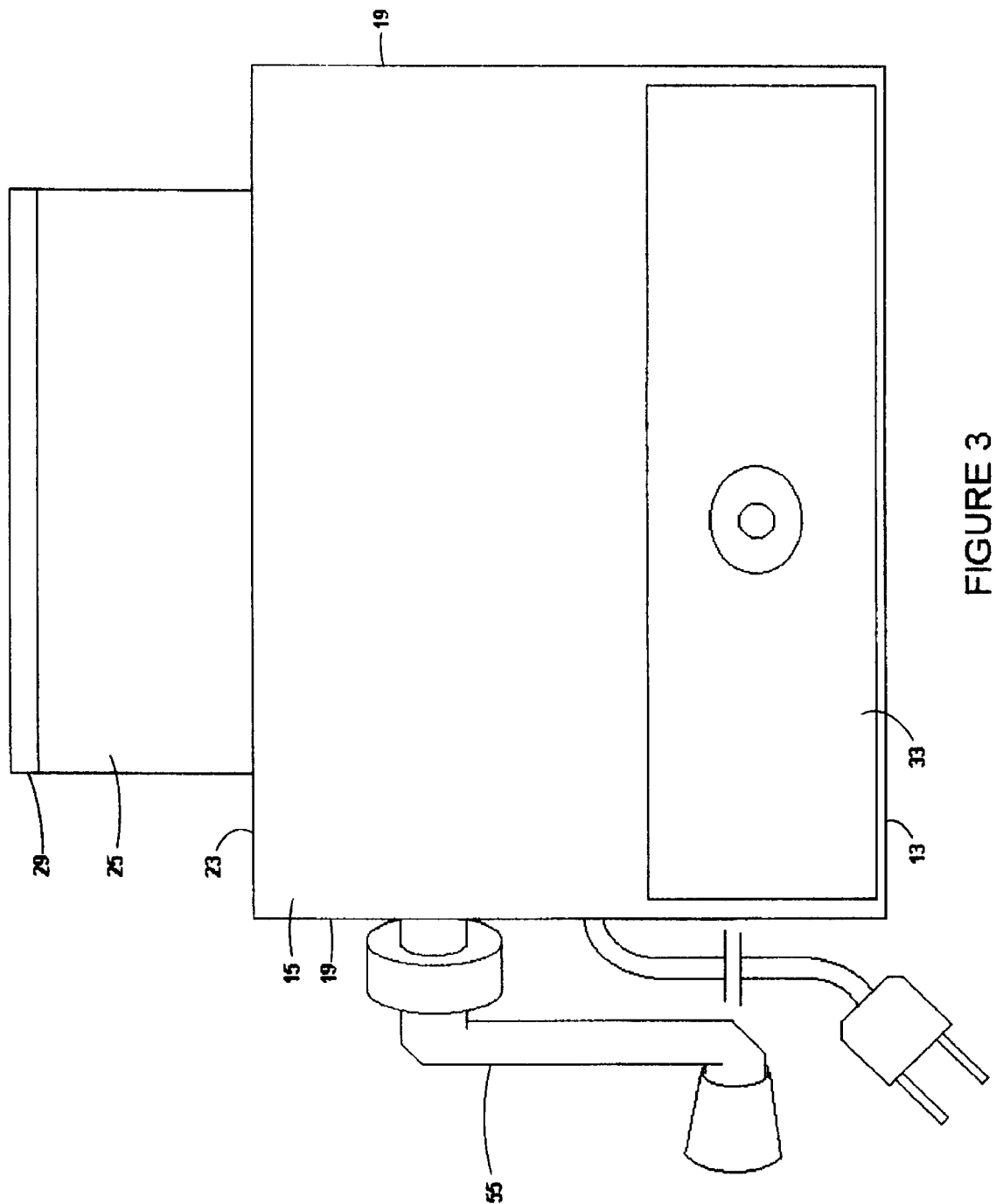

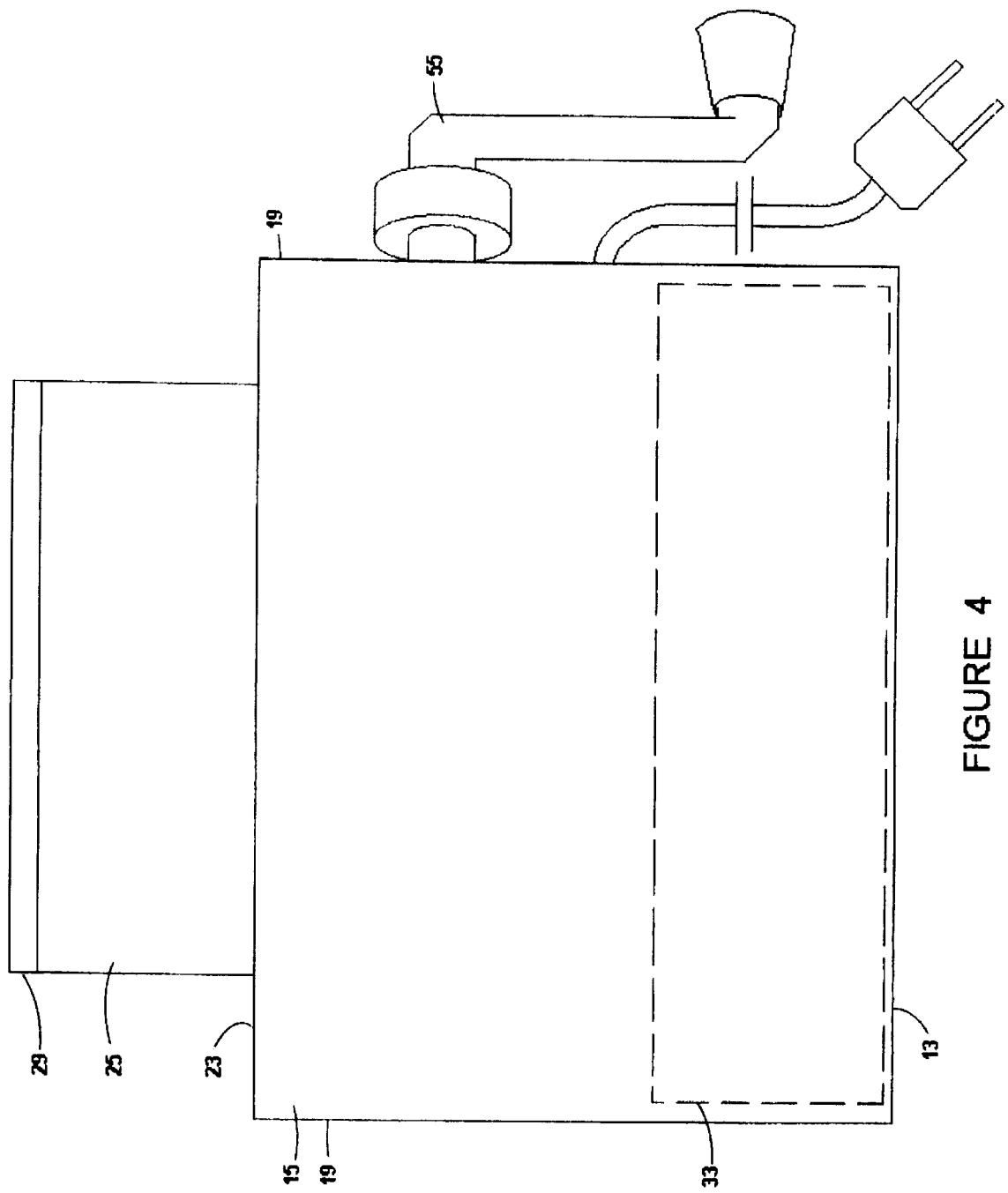

FOOD CUTTING DEVICE

BACKGROUND OF THE INVENTION

1. Field of the Invention

This invention relates to food cutting devices and more particularly to a food cutting device for processing a leafy vegetable such as collard greens.

2. Prior Art and Objects

Cooked collard greens are a nutritious vegetable enjoyed by many people. Like other leafy vegetables, collard greens reduce substantially in volume when cooked. As a result, a substantial quantity of raw collard greens must be prepared in order to have a reasonable quantity available for dining. The collard greens must be cut both along the stalk and across the stalk. Although collard greens represent a primary need for a cutting device, other leafy vegetables can be prepared using the food cutting device in accordance with this invention. Even lettuce, which is by no means poses the problems for preparation as do collard greens, can be cut into pieces using the food cutting device.

The preparation of collard greens is difficult, requiring the cutting of the collard greens into moderate sized pieces. To accomplish this, cutting with a knife is time consuming and hard on the hands.

Commercially available food processors chop food into particles. For collard greens, available food processors result in cutting that is too fine. Known food processors retain the food in the container where the processing occurs. The basic difference is between chopping the vegetable into small particles, as occurs in a food processor as opposed to cutting the food into moderately sized pieces and then dropping the cut pieces into a receptacle capable of holding a quantity of cut food so that substantial processing and accumulation can occur.

The problems of either using a knife or an existing food processor which does not form the desired sized particles are met by this invention which permits the cutting of a leafy vegetable to a desired size and dropping it into a receptacle where the processed leafy vegetable is stored while awaiting the processing of additional leafy vegetable.

Accordingly, it is an object of the present invention to provide a food cutting device that cuts a leafy vegetable, such as collard greens, to a predetermined size.

It is another object of the present invention to provide a food cutting device that cuts a leafy vegetable such as collard greens that is easy and safe to operate while rapidly reducing the leafy vegetable to the desired size.

It is another object of the present invention to provide a food cutting device that is durable and economical.

Other objects and advantages of the present invention will become apparent to those of ordinary skill in the art as the description proceeds.

SUMMARY OF THE INVENTION

In accordance with this invention, a device is provided for rapidly and easily cutting a leafy vegetable, such as collard greens, into moderately sized pieces suitable for cooking. Thus is accomplished by providing an enclosure with a feeder tube through which the vegetable is fed. A grooved roller having grooves equally spaced about its circumference rotates in the enclosure. Discs, mounted on a cutting roller, also within the enclosure, engage the grooves in the grooved roller and rotate in the opposite direction. When leafy vegetables are fed into the enclosure through the feeder tube, the leafy vegetable passes between the grooved roller and the discs of the cutting roller and are cut longitudinally by the discs pressing into the grooves.

As the leafy vegetable is passed out of the grooved roller and the cutting roller, a guide is located beneath the grooved roller with the grooves, to force the leafy vegetable that has already been cut by the grooved roller and the cutting roller generally to follow the path of the circumference of the grooved roller.

A pair of blade bars are provided. Each blade bar has two ends. One end of each blade bar is mounted to rotate. At the other end a blade holder for mounting a blade is provided. The blade extends between the pair of blade holders. The pair of blade bars includes a cam follower which follows cams mounted at both ends of the cutting roller on which the cutting discs are mounted. The blade, is directed against the grooved roller. As the cams turn with the cutting roller, the cam followers of the blade bars follow the cams. This causes the blade to move back and forth against the grooved roller and to strike the leafy vegetable. The blade cuts the leafy vegetable generally across the cuts formed by the cutting roller and the grooved roller. A pair of springs force the blade against the grooved roller whenever the cam so permits.

BRIEF DESCRIPTION OF THE DRAWINGS

FIG. 3 is a front elevation of the food cutting device.

FIG. 4 is a rear elevation of the food cutting device.

DETAILED DESCRIPTION OF THE PREFERRED EMBODIMENT

Figure 1:
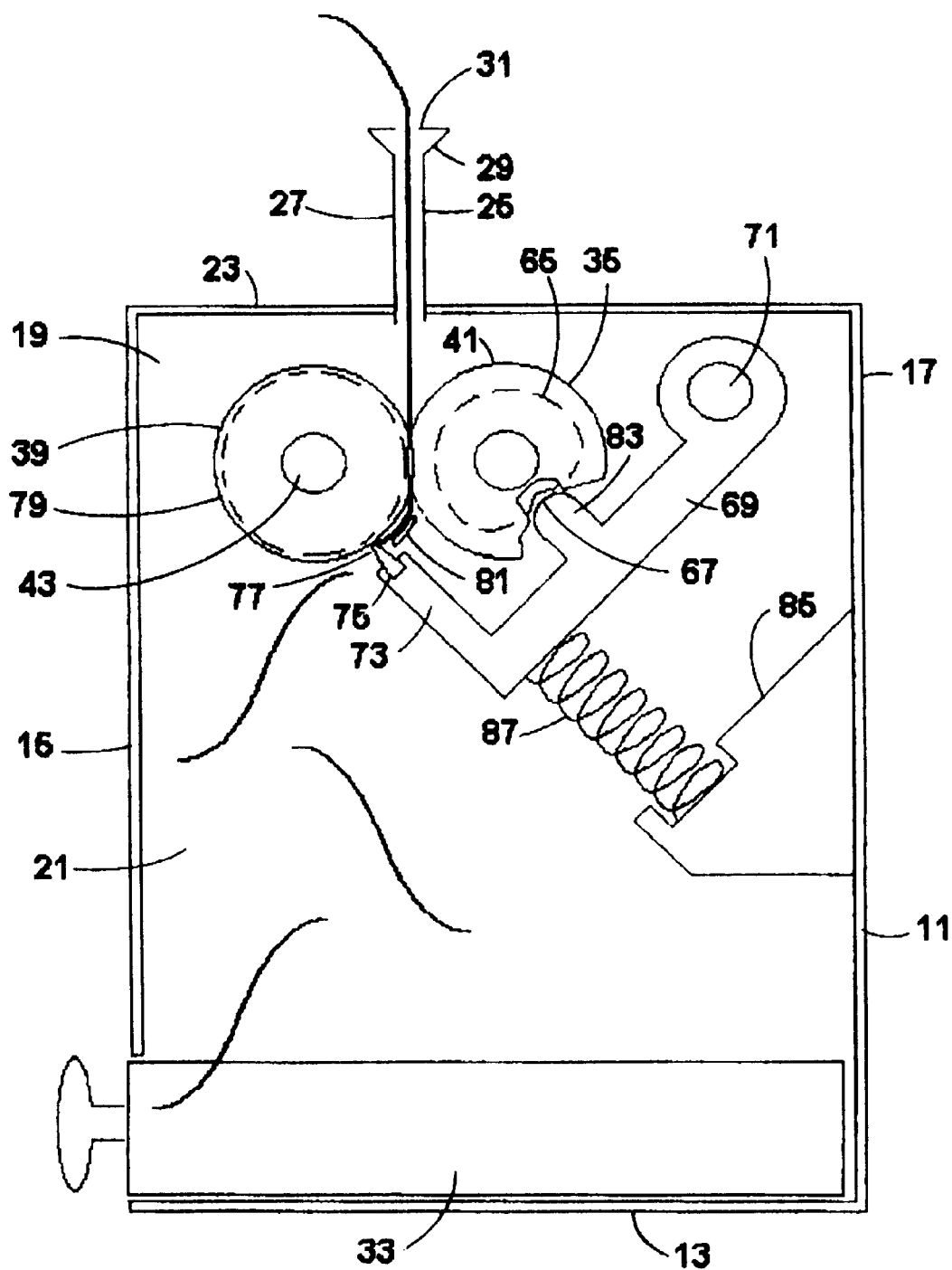
FIG. 1 is a side elevation of the food cutting device.

Referring now to FIG. 1, the food cutting device is shown having an enclosure 11. The enclosure 11 has a base sheet 13, a front wall 15 and a back wall 17. Two side walls 19 are located at generally right angles to the front wall 15 and the back wall 17. Within the enclosure 11 a compartment 21 is formed. A top sheet 23 is located generally parallel to the base sheet 13 and extends from the two side walls 19 and the front wall 15 and the back wall 17. A feeder 25 is located on the top sheet 23. The feeder 25 includes a conduit section 27 which has a rectangular cross section and a funnel section 29 with a cross section which is also rectangular but which decreases from an open end 31 to the conduit section 27. The feeder 25 is mounted on the top sheet 23 and has access to the compartment 21 through the top sheet 23.

Within the compartment 21, adjacent the base sheet 13 of the enclosure 11, a drawer 33 is located. The drawer 33 opens through the front wall 15. As an alternative to the drawer 33, the food cutting device may be built without the base sheet 13 of the enclosure 11 open to permit placing the food cutting device over a large receptacle (not shown), such as a large cooking pot, so that a greater quantity of food can be processes in a single batch. The drawer 33 serves to accumulate the cut leafy vegetable after it is processed. Where electrical power is used to operate the food cutting device, a drawer 33 that cannot be opened without interrupting the electrical power, provides a substantial safety measure. Manual power does not pose the same safety problems.

Figure 2:
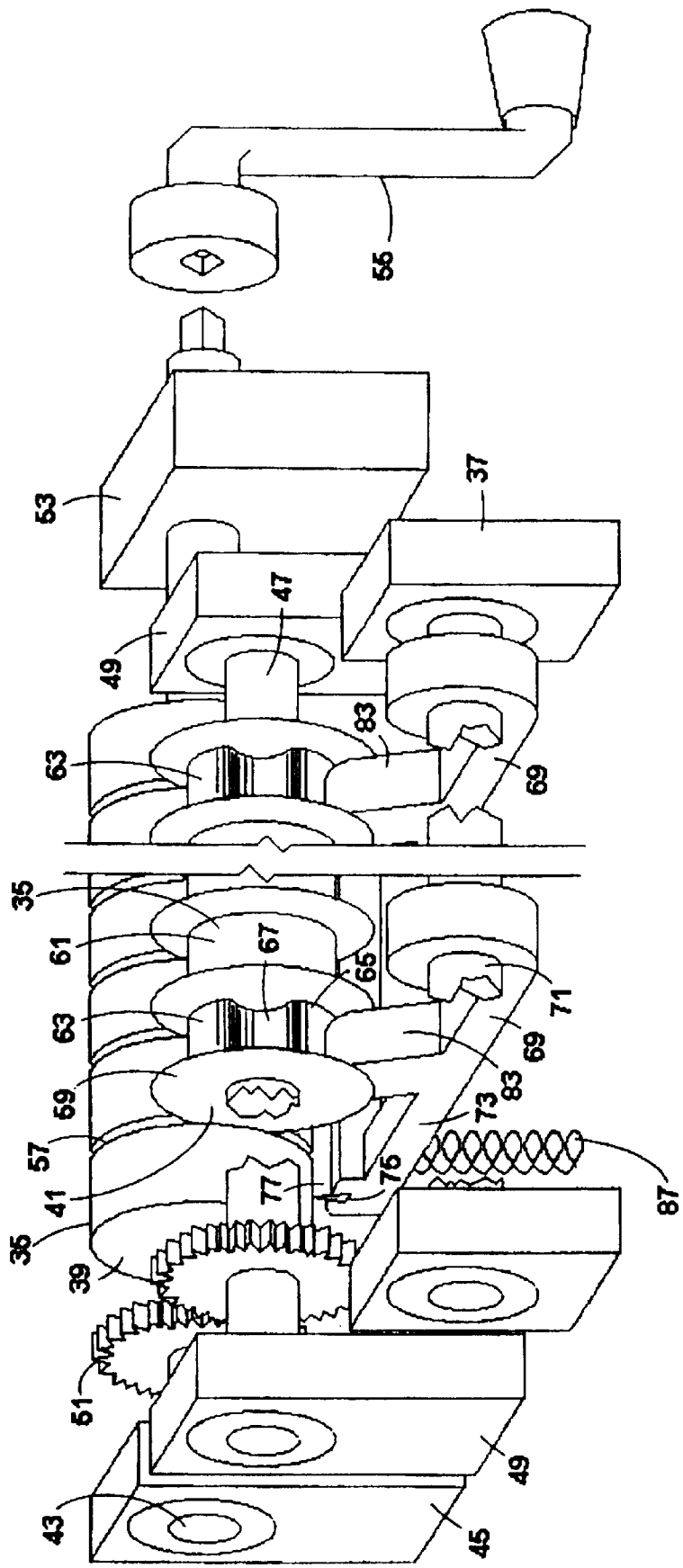
FIG. 2 is a pictorial view of the rollers and the blade bar, the blade and the cam follower.

As best seen in FIG. 2, a pair of rollers 35 are used to process the leafy vegetable. The rollers 35 rotate within journals 37 mounted in the side walls 19 of the enclosure 11. One of the rollers 35 is a grooved roller 39 which is mounted toward the front wall 15. The other roller 35 is a cutting roller 41. The grooved roller 39 is mounted on a grooved roller shaft 43. The grooved roller shaft 43 is mounted to rotate in a pair of grooved roller journals 45 which grooved roller journals 45 are mounted in the side walls 19 of the enclosure 11. The cutting roller 41 is mounted on a cutting roller shaft 47. The cutting roller shaft 47 is mounted to rotate in a pair of cutting roller journals 49 mounted in the side walls 19 of the enclosure 11.

The rollers 35 tangentially engage one another with the point of engagement being directly beneath the feeder 25. As a result, when a leafy vegetable is fed into the feeder 25, the leafy vegetable passes between the two rollers 35. The two rollers 35 rotate in opposite directions but both rollers 35 rotate so that they rotate toward one another and downwardly from the top sheet 23. As a result, leafy vegetables being fed through the feeder 25 are pulled downwardly between the two rollers 35. The two rollers 35 each have a gear 51 at one end inside the compartment 21. The two gears 51 engage one another and, being of the same size, assure that the rollers 35 will rotate at the same rotational speed and in the desired direction of rotation. Power to rotate the rollers 35 is applied to the rollers 35 from the end opposite from the gears 51 where the grooved roller shaft 43 extends outside the enclosure 11. The type of power is not important to the invention. An electric motor 53 may be used but a hand crank 55 is suitable and provides control of rotation as the leafy vegetable is fed through the feeder 25. Since the food cutting device must cut a large quantity of leafy vegetable, the cutting is most usually done in batches.

The grooved roller 39 has a series of grooves 57 about its periphery. The grooves 57 are substantially spaced equally along the grooved roller 39. The cutting roller 41 has a series of cutting discs 59 mounted on it. The cutting discs 59 are generally spaced equally along the cutting roller 41 so as to engage the grooves 57 in the grooved roller 39. Spacers 61 are mounted between the cutting discs 59. The spacers 61 adjacent the cutting discs 59 at the ends of the cutting roller 41 are cams 63 and have a rise 65 and a fall 67.

A pair of blade bars 69 are also mounted within the compartment 21. The blade bars 69 are mounted on a blade bar shaft 71 which is secured at both ends in the side walls 19. Each blade bar 69 is an elongated bar with two ends. One end of each blade bar 69, the end most remote from the rollers 35, is where the blade bar 69 is mounted is mounted on the blade bar shaft 71 on which the blade bars 69 rotate. At the opposite end each blade bar 69 there is a blade holder 73. The blade holder 73 is a protrusion at the end of the blade bar 69 with a groove 75 in it. A blade 77 is mounted securely in the groove 75. The blade 77 extends between the pair of blade bars 69. The blade 77 is directed against the periphery of the grooved roller 39. The point of contact of the blade 77 with the grooved roller 39 is beneath the point of contact between the grooved roller 39 and the cutting roller 41. Due to the presence of the cutting roller 41, the point of contact of the blade 77 with the grooved roller 39 is just off the low part 79 of the grooved roller 39 but toward the cutting roller 41. Since it desired to cut the leafy vegetable with the blade 77, it is essential that the leafy vegetable is placed in the path of the blade 77. To accomplish this, a guide 81 is provided. The guide 81 is a bar extending between the two side walls 19 and is curved to direct the leafy vegetable leaving the rollers 35 toward the circumference of the grooved roller 39 and in the line of the blade 77.

Each of the two blade bars 69 includes a cam follower 83. Each cam follower 83 is a protrusion on a blade bar 69 located between the blade bar shaft 71 and the blade holder 73 and is located on the same side of the blade bar 69 as the blade holder 73 The cam follower 83 is rounded to follow one of the cams 63.

A bracket 85 is mounted on the back wall 17 of the enclosure 11 beneath the blade bars 69. A pair of springs 87 is compressed between the blade bars 69 and the bracket 85. When the cam followers 83 reaches fall 67 in the cams 63, the spring 87 forces the blade bar 69 to rotate toward the grooved roller 39 and, as a result, the blade 77 moves toward the grooved roller 39 causing the blade 77 to cut the leafy vegetable against the grooved roller 39. As the cam followers 83 each leave the fall 67 in the cams 63 and engage the rise 65, the blade bar 69 is then forced away from the grooved roller 39 until a fall 67 in the cams 63 is again reached by the cam followers 83. The blade 77 makes a horizontal cut across the leafy vegetable. The cutting discs 59 have already cut the leafy vegetable vertically and the horizontal cut of the blade 77, results in generally rectangular pieces of leafy vegetable being formed which then drop down into the drawer 33.

Thus while a preferred embodiment of the invention has been shown and described, it will be apparent to those skilled in the art that many other changes and modifications may be made without departing from the invention in its broader aspects. The appended claims are therefore intended to cover all such changes and modifications as fall within the true spirit and scope of the invention.

I claim:

1. A food cutting device comprising:

an enclosure;

a feeder mounted on the enclosure;

a grooved roller having grooves about its circumference, the grooves being generally equally spaced;

means for mounting the grooved roller to rotate in the enclosure;

a cutting roller, the cutting roller including a plurality of cutting discs, the cutting discs being spaced to engage the grooves in the grooved roller, each cutting roller including a cam means;

means for mounting the cutting roller to rotate in the enclosure;

means for supplying rotational power to the grooved roller and the cutting roller;

means to rotate the grooved and the cutting roller in opposite directions of rotation;

a blade directed toward the grooved roller; and means including the cam means for moving the blade to and from the grooved roller.

2. A food cutting device according to claim 1 wherein:

the means including the cam means for moving the blade to and from the grooved roller includes a pair of blade bars each having two ends and including a cam follower and having a blade holder at one end.

3. A food cutting device according to claim 1 wherein the means to rotate the grooved roller in opposite directions of rotation includes a pair of gears, one gear mounted on the grooved roller and the other gear mounted on the cutting roller, the gears engaging one another.

4. A food cutting device according to claim 1 wherein the means including the cam means for moving the blade to and from the grooved roller includes:

a pair of blade bars each having two ends and including a cam follower and having a blade holder at one end, the blade being mounted in the blade holder, each cam follower engaging a cam.

5. A food cutting device according to claim 1 wherein the cam means includes a pair of cams mounted on the cutting roller and further including a pair of blade bars each having two ends and including a cam follower and having a blade holder at one end, the blade being mounted in the blade holder, each cam follower engaging a cam.

6. A food cutting device according to claim 1 wherein the means including the cam means for moving the blade to and from the grooved roller further includes a spring.

7. A food cutting device comprising:

an enclosure;

a feeder mounted on the enclosure;

a grooved roller having grooves about its circumference, the grooves being generally equally spaced;

means for mounting the groove roller to rotate within the enclosure;

a cutting roller, the cutting roller including a plurality of cutting discs, the cutting discs being spaced to engage the grooves in the grooved roller, spacers being mounted between the disc blades, the spacers at each end of the cutting roller being a cam having a rise and a fall about its circumference;

means for mounting the cutting roller to rotate within the enclosure;

means for supplying rotational power to both the grooved roller and the cutting roller and to rotate the grooved roller and the cutting roller in opposite directions;

a pair of blade bars each having two ends and including a cam follower between the two ends and including a blade holder at one end;

means for mounting the blade bar at the end of the blade bar opposite from the blade holder to rotate within the enclosure;

a blade mounted in the blade holders of the pair of blade bars and extending between the pair of blade holders, the blade being directed toward the grooved roller, the cam follower of each blade bar engaging one of the cams; and means for forcing the blade bars towards the grooved roller.

8. A food cutting device according to claim 7 means to supply rotational power to both the grooved roller and the cutting roller is a hand crank and the means to rotate the grooved roller and the cutting roller in opposite directions includes a pair of gears, one gear mounted on the grooved roller and the other gear mounted on the cutting roller, the gears engaging one another.

9. A food cutting device according to claim 7 means to supply rotational power to both the grooved roller and the cutting roller is an electric motor and the means to rotate the grooved roller and the cutting roller in opposite directions includes a pair of gears, one gear mounted on the grooved roller and the other gear mounted on the cutting roller, the gears engaging one another.

10. A food cutting device according to claim 7 wherein the means for forcing the blade bars towards the grooved roller includes a spring.

* * * * *